No. 672,519. Patented Apr. 23, 1901.
J. ANDERSON & F. HARDART.
ROTARY CUTTER.
(Application filed Feb. 14, 1900.)
(No Model.)
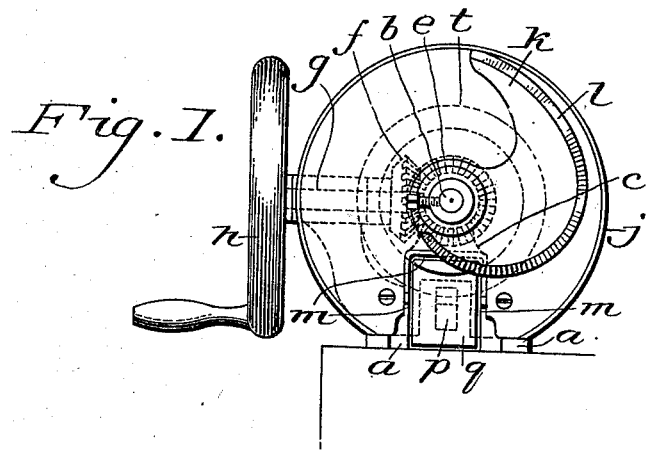
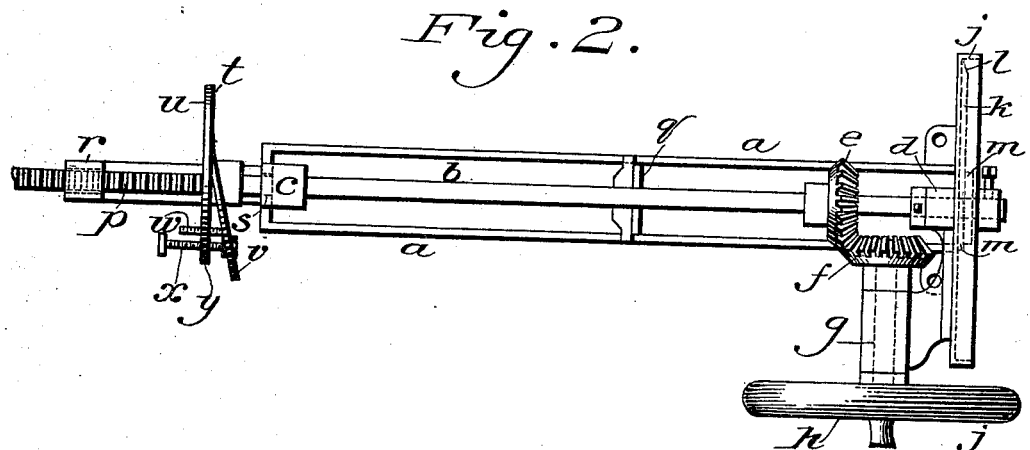
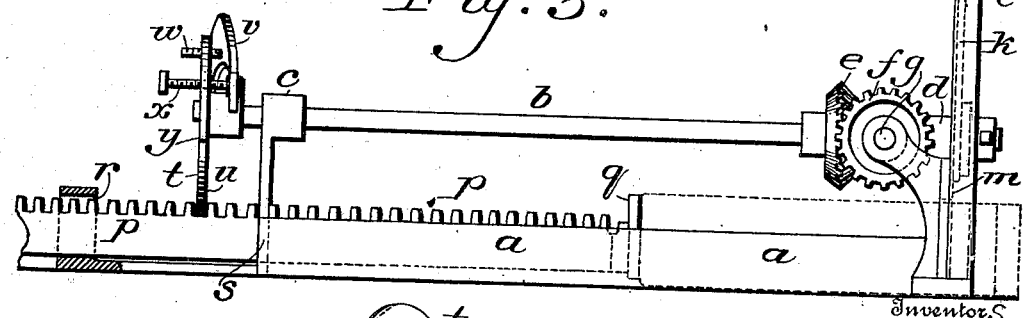
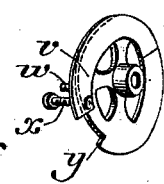
Witnesses
Inventors
John Anderson
Frank Hardart
By Wiedersheim & Fairbanks
Attorneys

UNITED STATES PATENT OFFICE.

JOHN ANDERSON AND FRANK HARDART, OF PHILADELPHIA, PENNSYLVANIA, ASSIGNORS TO JOHN ANDERSON, FRANK HARDART, AND JOSEPH V. HORN, OF SAME PLACE.

ROTARY CUTTER.

SPECIFICATION forming part of Letters Patent No. 672,519, dated April 23, 1901.

Application filed February 14, 1900. Serial No. 5,149. (No model.)

*To all whom it may concern:*

Be it known that we, JOHN ANDERSON and FRANK HARDART, citizens of the United States, residing in the city and county of Philadelphia, State of Pennsylvania, have invented a new and useful Improvement in Cutters, which improvement is fully set forth in the following specification and accompanying drawings.

Our invention consists of an improved construction of a cutter which is especially adapted for cutting bread, meat, butter, or any other or similar material, the material to be cut being fed uniformly and evenly by the rotation of the operating-wheel and the material cut being propelled upon a table or other support without being separated or thrown from the machine.

The invention also consists of an improved construction of an indicator which is applied to the feeding device, thereby showing the thickness of the cut desired and enabling the operator to instantly adjust the feeding device to cut any desired thickness.

It further consists of novel details of construction, all as will be hereinafter fully set forth, and particularly pointed out in the claims.

Figure 1 represents an end elevation of a cutter embodying our invention. Fig. 2 represents a plan view of the cutter. Fig. 3 represents a side elevation of the same. Fig. 4 represents a perspective view of the adjustable feeding device, whereby the amount of the feed is regulated according to requirements.

Similar letters of reference indicate corresponding parts in the figures.

Referring to the drawings, $a$ designates the framework of the cutter, above which the rotary shaft is mounted in bearings $c$ and $d$, said shaft carrying near one extremity thereof the beveled gear $e$, which meshes with the bevel-gear $f$, mounted on the shaft $g$, to which latter is secured the wheel $h$, which is rotated by means of a handle or other suitable means, said wheel being omitted from Fig. 3 for the sake of clearness of illustration.

The shaft $b$ is extended through the housing $j$, within which is contained the knife or cutter $k$, which is provided with the cutting edge $l$, of substantially the contour seen in Fig. 1, said knife or cutter being held in position upon its shaft by any suitable means.

The housing $j$ is provided with the opening or throat $m$, through which the bread, butter, meat, or other material to be cut is pushed by means of the feeding device, which consists of the rack $p$, having the plate $q$ attached thereto, said rack being movably guided or propelled through the ways $r$ and $s$ and actuated or advanced by the engagement of the teeth thereof with the worm device $t$ or its equivalent, the same consisting of a disk or body portion $u$, which has a deflected member $v$, which carries the graduated pin or scale $w$, the position of the deflected member $v$ being readily adjusted or determined by means of the threaded stem $x$, which is connected to the member $v$ at or near the free end thereof, it being apparent that the screw or stem $x$ can be readily manipulated by the fingers, so as to bring said member $v$ toward or away from the body portion $u$, wherefrom it will be apparent that the rotation of the shaft $b$ and the worm device $t$ will cause the rack to be positively fed. The body portion $u$ is provided with a recessed portion $y$, whereby when the rack has been fed to its farthest extent toward the knife it can be withdrawn in a direction from the said knife, so as to enable a fresh quantity of material to be placed in position.

The operation is as follows: The material to be cut is placed against the plate $q$ in the manner indicated in dotted lines in Fig. 3, wherefrom it will be apparent that the rotation of the wheel $h$ will cause the shaft $b$ and the worm device $t$ to simultaneously rotate and also the knife $k$, wherefrom it will be seen that after each cut said worm or feeding device will propel the rack to the desired extent, so as to move the material to be cut into position for the next cut.

By manipulating the screw $x$ the extent of the feed can be regulated according to requirements, as is evident.

It will be seen from the foregoing that the cutter is exceedingly simple in construction and not liable to get out of order, and the same can be operated by unskilled labor.

Having thus described our invention, what we claim as new, and desire to secure by Letters Patent, is—

1. In a cutter, the combination of suitable housing, a shaft suitably supported and extending longitudinally above the framework, a rack below said shaft, a cutting device carried by said shaft, means for rotating the latter, a worm device mounted on said shaft, said worm device consisting of a top portion having a deflected member mounted thereon, and a threaded screw or stem secured to the free end of said member and engaging the body portion, whereby the distance between the free ends of said member and said body portion can be adjusted, said worm device being adapted to engage with the said rack.

2. In a cutter, the combination of suitable housing, a shaft suitably supported and extending longitudinally above the framework, a rack below said shaft, a cutting device carried by said shaft, means for rotating the latter, a worm device mounted on said shaft, said worm device consisting of a top portion having a deflected member mounted thereon, a threaded screw or stem secured to the free end of said member and engaging the body portion, whereby the distance between the free ends of said member and said body portion can be adjusted, said worm device being adapted to engage with the said rack, and a graduated pin or gage mounted on said deflected member and projecting through said body portion whereby the amount of feed can be quickly determined.

JOHN ANDERSON.
FRANK HARDART.

Witnesses:
WM. CANER WIEDERSHEIM,
HARRY COBB KENNEDY.